United States Patent
Fujita et al.

(10) Patent No.: US 12,335,167 B2
(45) Date of Patent: Jun. 17, 2025

(54) SECURITY FUNCTION EXECUTION DEVICE

(71) Applicant: HITACHI, Ltd., Tokyo (JP)

(72) Inventors: Junya Fujita, San Jose, CA (US); Noritaka Matsumoto, Tokyo (JP)

(73) Assignee: HITACHI, Ltd., Tokyo (JP)

( * ) Notice: Subject to any disclaimer, the term of this patent is extended or adjusted under 35 U.S.C. 154(b) by 131 days.

(21) Appl. No.: 18/223,872

(22) Filed: Jul. 19, 2023

(65) Prior Publication Data
US 2025/0039108 A1   Jan. 30, 2025

(51) Int. Cl.
  *G06F 15/16*   (2006.01)
  *H04L 47/70*   (2022.01)
  *H04L 47/78*   (2022.01)

(52) U.S. Cl.
  CPC .......... *H04L 47/821* (2013.01); *H04L 47/781* (2013.01)

(58) Field of Classification Search
  CPC .................... H04L 47/821; H04L 47/781
  USPC ...................................................... 709/226
  See application file for complete search history.

(56) References Cited

U.S. PATENT DOCUMENTS

| | | | |
|---|---|---|---|
| 10,516,689 B2 | 5/2019 | Christian | |
| 11,374,689 B2* | 6/2022 | James | H04L 69/40 |
| 2014/0173336 A1* | 6/2014 | Bennah | G06F 11/2028 |
| | | | 714/4.12 |
| 2018/0359612 A1* | 12/2018 | Buckley | H04L 65/611 |
| 2021/0320944 A1* | 10/2021 | Ogle | H04W 12/009 |

FOREIGN PATENT DOCUMENTS

| | | | | |
|---|---|---|---|---|
| CN | 105376156 B | * | 7/2018 | ........... H04L 45/124 |
| JP | 4339004 B2 | * | 10/2009 | ......... G06K 9/00449 |
| WO | WO-2018000197 A1 | * | 1/2018 | ......... G06F 9/45558 |

OTHER PUBLICATIONS

S. Whalen, "An Introduction to ARP Spoofing," Apr. 2001 https://priv.gg/e/arp_spoofing_intro.pdf.

* cited by examiner

*Primary Examiner* — Ruolei Zong
(74) *Attorney, Agent, or Firm* — PROCOPIO, CORY, HARGREAVES & SAVITCH LLP

(57) ABSTRACT

A security function execution device in communication with a network. The device may include a processor, the processor is configured to: identify attributions of a plurality of nodes in communications with the network; determine criticality of each node of the plurality of nodes based on the attributions; and mediate communications between nodes of the plurality of nodes that are determined as being non-critical and execute security functions on the mediated communications.

16 Claims, 9 Drawing Sheets

SECURITY FUNCTION EXECUTION DEVICE

BACKGROUND

Field

The present disclosure is generally directed to a method and a device for security function execution.

Related Art

Enabling security measures in legacy Operational Technology (OT) systems such as Factory Automation (FA) and Process Automation (PA) is particularly challenging due to required system updates and/or partial replacements. In most cases, it is difficult to update all OT systems just to address security problems due to the expensive engineering cost. In order to strengthen cyber security, assessment of cyber security risk and planning of cost-effective countermeasures, including enabling temporary security solutions for OT system users, are an area of focus.

Network mediation (Man-in-the-Middle (MitM)) is useful in securing communications between two nodes for legacy networks. However, communication delays and resource depletions can occur through use of the MitM on internet protocol-based (IP-based) networks (wired networks such as Ethernet or wireless networks such as WiFi). The resulting control loss can critically impact legacy OT systems. Therefore, it is difficult to apply the MitM technique on legacy IP-based network systems in OT systems.

In the related art, a security feature enabling method using proxy server is disclosed. Proxy server performs security function execution by mediating communications between nodes. However, meditation of communication is performed on all communications between any two nodes on the network. This causes communication delays and reduces resource availability. The impact is especially critical for businesses utilizing legacy OT systems as production stoppage and safety features loss may occur as result of communication delays.

In addition, vulnerability is not the same across all nodes. For instance, assuming that two nodes are connected to a network, network A, with the first node being a Windows™ personal computer (PC) that is connected to the enterprise systems, and the other being an embedded system which is connected to other networks through network A. In that case, the Windows PC node is comparatively more vulnerable than the embedded system node. An adversary may attack the critical node via nodes that are more vulnerable than the critical node. The related art does not set forth any rules for narrowing down communications to obtain effective security efforts.

There exists a need for enabling security measures in legacy OT systems without changing system configuration and additional updates.

SUMMARY

Aspects of the present disclosure involve an innovative method for security function execution. The method may include identifying, by a processor, attributions of a plurality of nodes in communications with a network; determining, by the processor, criticality of each node of the plurality of nodes based on the attributions; and mediating, by the processor, communications between nodes of the plurality of nodes that are determined as being non-critical and executing security functions on the mediated communications.

Aspects of the present disclosure involve an innovative non-transitory computer readable medium, storing instructions for security function execution. The instructions may include identifying attributions of a plurality of nodes in communications with a network; determining criticality of each node of the plurality of nodes based on the attributions; and mediating communications between nodes of the plurality of nodes that are determined as being non-critical and executing security functions on the mediated communications.

Aspects of the present disclosure involve an innovative device for performing security function execution and in communication with a network. The device may include a processor, the processor is configured to: identify attributions of a plurality of nodes in communications with the network; determine criticality of each node of the plurality of nodes based on the attributions; and mediate communications between nodes of the plurality of nodes that are determined as being non-critical and execute security functions on the mediated communications.

Aspects of the present disclosure involve an innovative system for security function execution. The system may include means for identifying attributions of a plurality of nodes in communications with a network; means for determining criticality of each node of the plurality of nodes based on the attributions; and means for mediating communications between nodes of the plurality of nodes that are determined as being non-critical and executing security functions on the mediated communications.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

DETAILED DESCRIPTION

Figure 1:
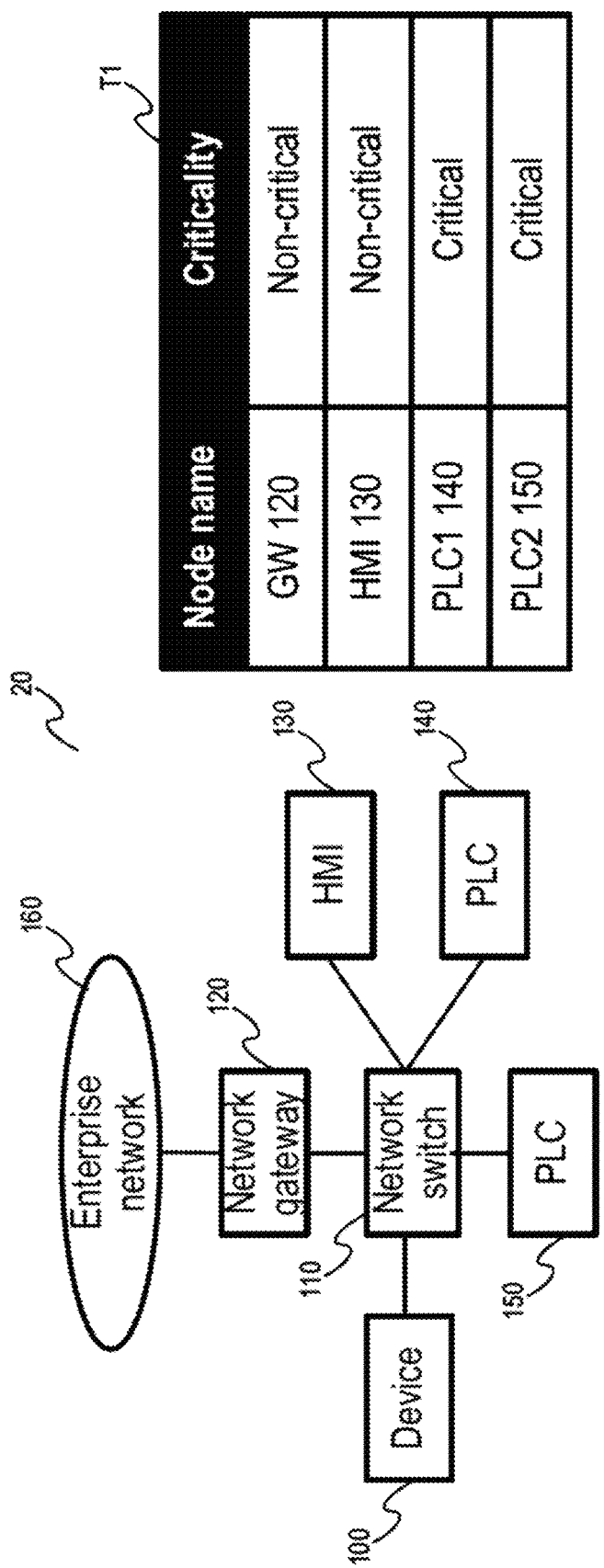
FIG. 1 illustrates an example communication system 20, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Present example implementations relate to security function execution methods and systems for intercepting communications between flagged nodes. The flags are defined based on the criticality of each node that is connected to the network. Criticality is defined based on the role of system architecture and processing state of the node. Security features are executed while limiting communication mediation to nodes having low criticality. Network data collection can be performed on the networks or nodes that join the networks in a target system through any automatic or manual method. At the same time, attributions about criticality can also be determined based on roles and states of each node. Example implementations also enable security functions such as deep intrusion analysis, packet filtering, authentication features, etc.

FIG. 1 illustrates an example communication system 20, in accordance with an example implementation. As illustrated in FIG. 1, the communication system 20 may include components such as, but not limited to, a device 100. a network switch (SW) 110, a network gateway (GW) 120, a human-machine interface (HMI) 130, a plurality of programmable logic controllers (PLCs) (e.g. PLC 140 and PLC 150), an enterprise network 160, etc.

Device 100 has the ability to join any IP-based network. With respect to an Ethernet-based network, device 100 has the ability to join the network via free ports on the network switch 110. Device 100 can obtain its Internet Protocol (IP) address for the network manually or automatically (DHCP, network capturing, self-IP assignment, etc.). On obtaining its IP address, the device 100 gathers information about the network. The device 100 tries to scan the network using network and port scanning techniques or loading packet capture (PCAP) files that can be obtained from the network switch 110. Device 100 also has the ability to load information that a user inputs manually via a Graphical User Interface (GUI) or a Command Line Interface (CLI).

Device 100 determines the criticality of each node that device 100 identifies in the network by algorithms that are processed on computing features of the device 100. Criticality is expressed as a set of attributions, or numerical values such as levels on each node. The numerical values can be computed from those attributions. Table T1 as shown in FIG. 1 illustrates criticalities associated with the various nodes of the communication system 20. For instance, criticality of "Non-critical" is associated with the network GW 120.

Figure 2:
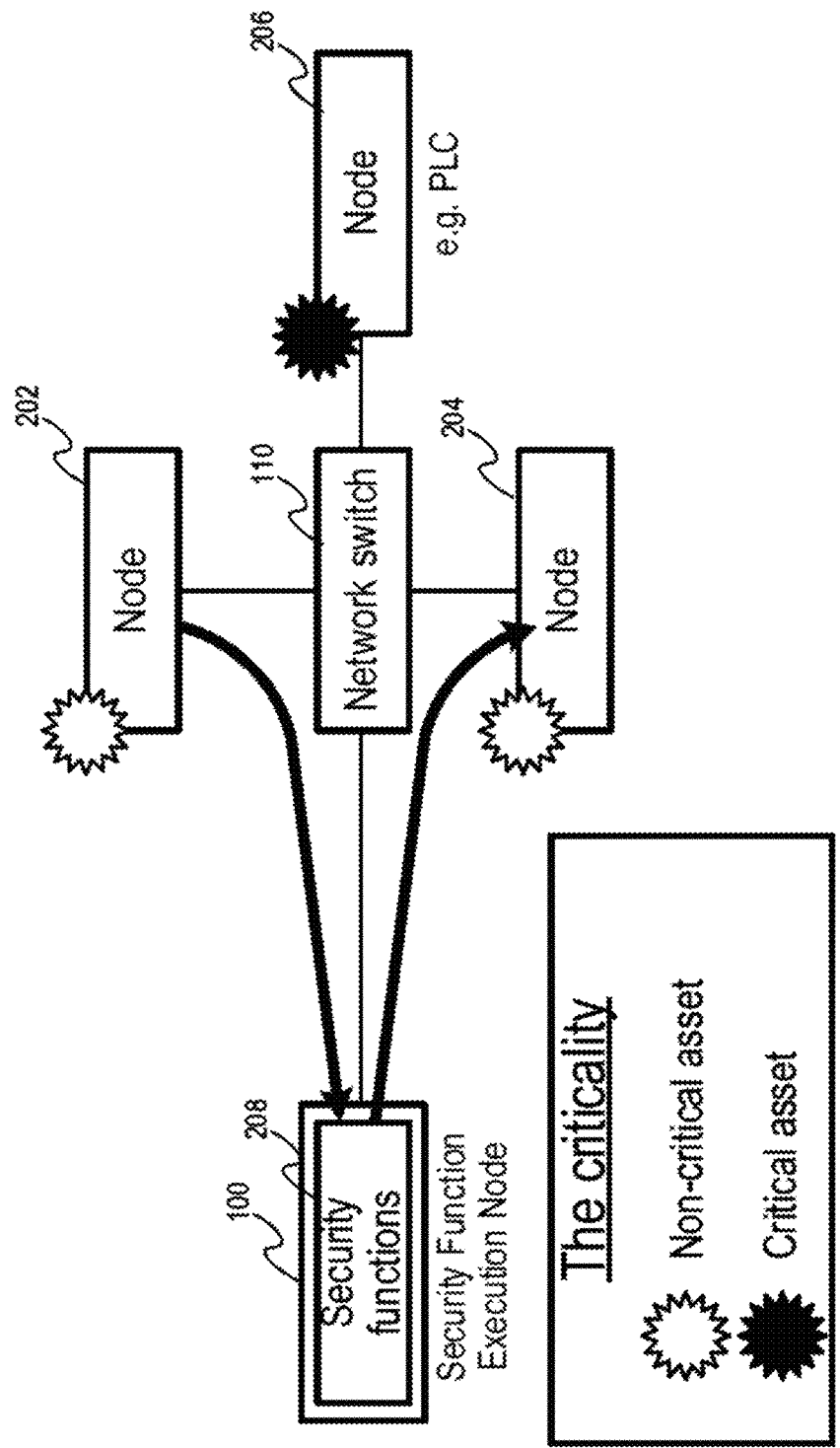
FIG. 2 illustrates an example diagram showing application of security functions on communications, in accordance with an example implementation.

Communication mediation between any two nodes that joined the same network is performed by the device 100. Specifically, device 100 selects communications to be mediated using criticality associated with each node. Communication mediation is performed between nodes that are determined as non-critical, while communication between nodes that are critical is excluded from communication mediation. Taking table T1 of FIG. 1 as example, communications with network GW 120 and HMI 130 are selected for mediation for having criticality of "non-critical". FIG. 2 illustrates an example diagram showing application of security functions on communications, in accordance with an example implementation. For nodes being determined as non-critical assets (e.g. node 202 and node 204), security functions 208 of device 100 can be applied to communications between such nodes to ensure communication security.

Referring back to FIG. 1, device 100 does not mediate communication between PLC 140 and PLC 150. In most cases, communications between PLCs include control data which is critical and essential for system control processes. If communications between PLCs were mediated, this could lead to loss in data communications and create issues in control operations. As illustrated in FIG. 2, communication with node 206 (e.g. PLC) is excluded from communication mediation by device 100, and hence security functions 208 are not applied. Therefore, device 100 enables efficient security measures for legacy systems while limiting communications to be mediated.

Devices utilizing modern enterprise OSs tend to be more vulnerable than those that do not. For instance. if the network GW 120 is connected to the enterprise network 160, then the network GW 120 becomes more vulnerable than other nodes on the same network. The adversary may attack a PLC (e.g. PLC 140, PLC 150, etc.) via the network GW 120. Therefore, communications between network GW 120 and the PLCs need to be protected preferentially than those between PLCs.

Figure 3:
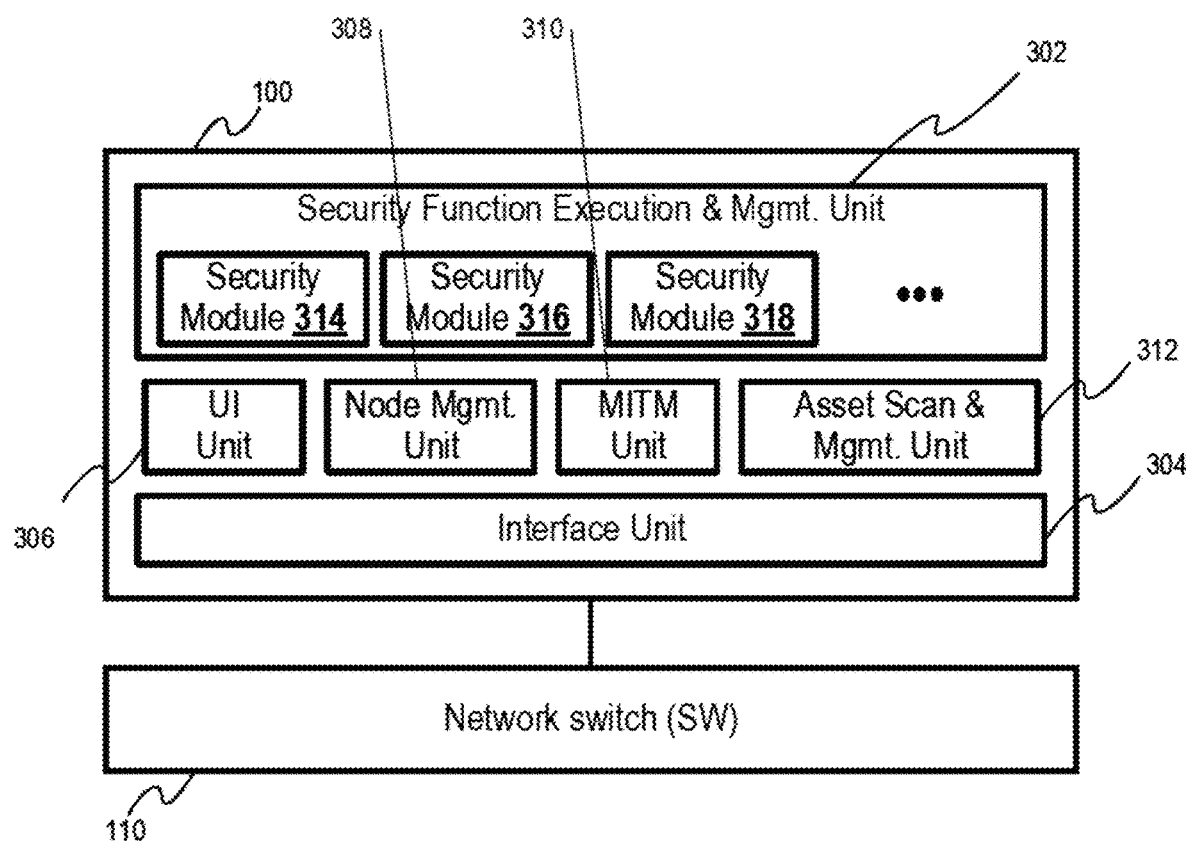
FIG. 3 illustrates an example system 300 of the device 100, in accordance with an example implementation.

FIG. 3 illustrates an example system 300 of the device 100, in accordance with an example implementation. As illustrated in FIG. 3, the system 300 may include components such as a security function execution management unit 302, an interface unit 304, a user interface (UI) unit 306, a node management unit 308, a MitM unit 310, and an asset scan and management unit 312. The interface unit 304 joins the device 100 to the network that is controlled by the network switch 110. The UI unit 306 supports communications with user through graphic image display and/or command-line input.

The node management unit 308 manages the nodes detected by the device 100 through node characteristic management, which may include identification and population of node address and attributions. The MitM unit 310 performs communication mediation between nodes joined to the network. The asset scan and management unit 312 performs node scanning and analysis of nodes joined to the work. In addition, the asset scan and management unit 312 can connect to a database on a secondary memory of device 100 and refer to database to retrieve attributions associated with each node for additional processing.

The security function execution and management unit 302 performs security feature executions such as deep intrusion analysis, packet filtering, and authentication on the communications that device 100 mediates. Each security feature may be performed by a different security module of the security function execution and management unit 302 (e.g. deep intrusion analysis may be performed by security module 314, packet filtering may be performed by security module 316, authentication may be formed by security module 318, etc.)

In some example implementations, various units can be implemented by software libraries, including OS native functions, with software data stored in the secondary memory of device 100. In some example implementations, some or all functions of each unit might be implemented as hardware logics.

Figure 4:
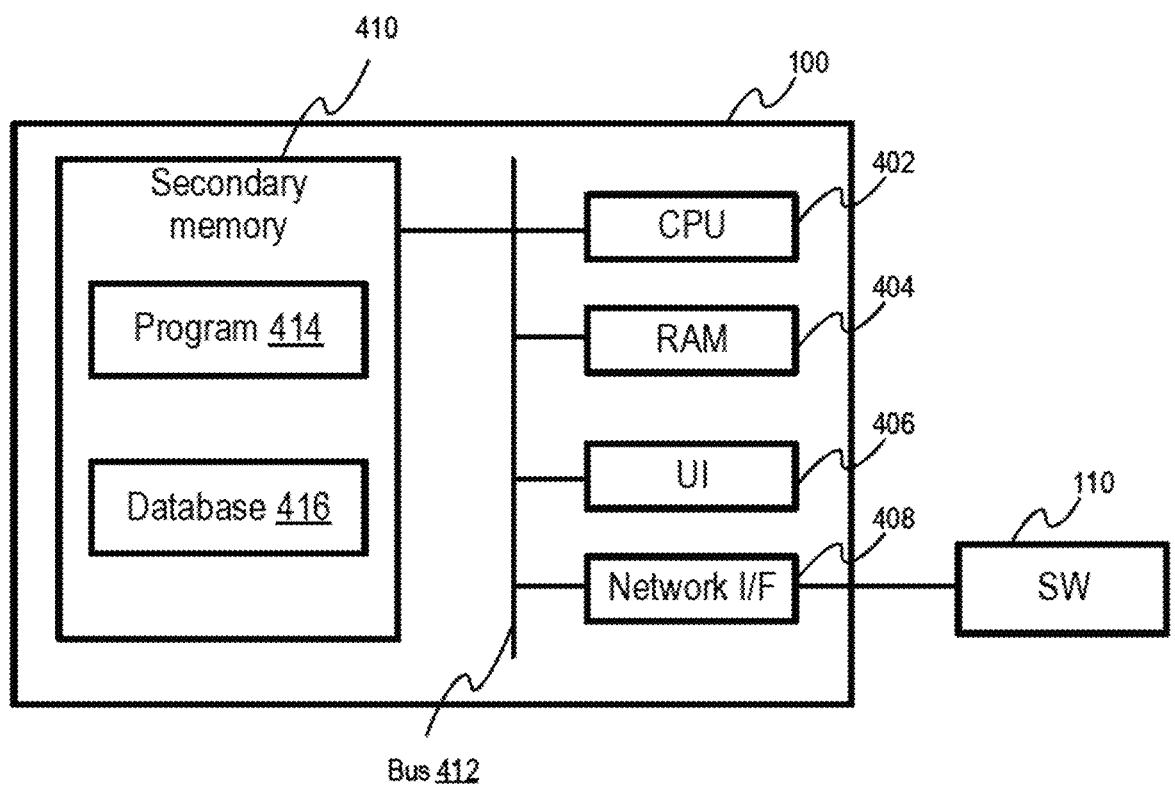
FIG. 4 illustrates an example hardware architecture of the device 100, in accordance with an example implementation.

FIG. 4 illustrates an example hardware architecture of the device 100, in accordance with an example implementation. The hardware architecture may include components such as a central processing unit (CPU) 402, a random-access memory (RAM) 404, a user interface (UI) 406, a network interface (IF) 408, and a secondary memory 410. In some example implementations, the secondary memory 410 is a non-volatile storage device. The secondary memory 410 stores program data/program 414 such as instructions for performing functions of device 100 and optional tools such as network scanning. UI applications, database management, and other support applications. The secondary memory 410 may also include a database 416 for referencing the criticality associated with each node. The various components communicate with one another through bus 412.

Criticality of the node means the degree to which business functions processed by the node are not to be interacted by the security function execution device. The criticality can be expressed by expressions such as "critical" or "non-critical". The criticality of each node is defined based on the role of system architecture and processing state of the node.

A node is critical when the following conditions are met: (a) the node handles critical processes of business operations; and (b) the node does not have enough computing resources, and unintended consumption of the resources may affect its business functions. In some example implementations, computing resource sufficiency is determined by determining whether computing resource is equal to or more than a resource threshold. If the computing resources are less than the resource threshold and the node is used to handle critical processes of business operations, then the node is determined as critical. A node is non-critical when the following conditions are met: (a) the node does not handle critical processes of business operations; and (b) the node has sufficient computing resources, and unintended consumption of resources is acceptable to a certain extent. For example, if the computing resources are equal to or more than the resource threshold and the node does not handle critical processes of business operations, then the node is determined as non-critical.

In some example implementations, criticality can be determined from system architecture and/or processing state. System architecture may include network structure (whether connected to external networks or not), type of device (e.g. enterprise OS, embedded device, etc.), and application type (e.g. server, data logging, field control, visualization of control, etc.) Processing state may include resource (e.g. CPU, memory, etc.) and processing state defined for each node (e.g. "Stop", "Running", etc.), In some example implementations, criticality can be determined through use of determining algorithms. Such algorithms may include rule-based algorithms (e.g. decision tree, decision matrix, etc.) In addition, criticality can also be determined based on predetermined business category models or asset state models.

Figure 5:
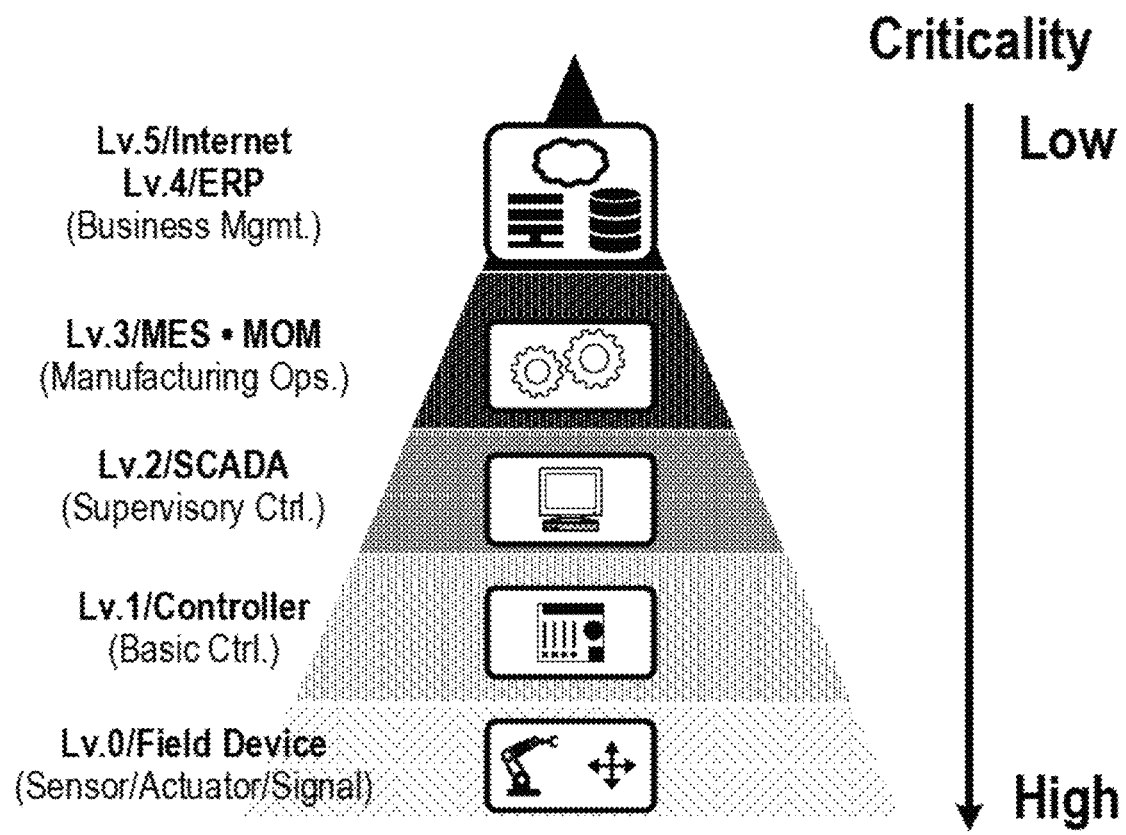
FIG. 5 illustrates an example business category model for determining criticality, in accordance with an example implementation.

FIG. 5 illustrates an example business category model for determining criticality, in accordance with an example implementation. A Purdue™ enterprise reference architecture (PERA, ISA-95) is shown in FIG. 5. PERA is a commonly used architectural reference model for industrial automation and control systems.

Six levels of business functions are defined using the PERA, which include software components and hardware components. Lv.0 corresponds to the field device layer and may include sensors, actuators, signals, etc. Lv.1 corresponds to the controller layer, which may include basic controls. Lv.2 corresponds to the Supervisory Control and Data Acquisition (SCADA) layer, which may include supervisory controls. Lv.3 corresponds to the manufacturing operation management (MoM)/manufacturing execution systems (MES) layer, which may include manufacturing operations, etc. Lv.4 corresponds to the enterprise resource planning (ERP) system and business strategy layer, which may include business management operations. Lastly, Lv.5 corresponds to the internet and cloud layer for linking external services. As illustrated in FIG. 5, criticality is lowest at Lv. 5 and highest at Lv. 0.

An asset state model is a relational model between asset states and criticality. Asset states such as hardware, platform software such as operating systems, network connectivity or computing, and data processing performance can be used in determining criticality of an asset. If the node is an embedded device with limited computing resources or devices with extremely low communication response performance, the criticality of the node is "high".

In some example implementations, if a node is a device with an enterprise OS (e.g., Windows™, Linux™, etc.), a device with high communication response performance, or a device that is connected to an external network such as the internet, the criticality of the node is set to "low". Such nodes are known to possess high data processing performance and high security risk.

In some example implementations, criticality of a node can be determined by feature values associated with the node. The feature values can be obtained from information or data obtained from the node and networks that the node joins, system design documents, or information input by users.

Figure 6:
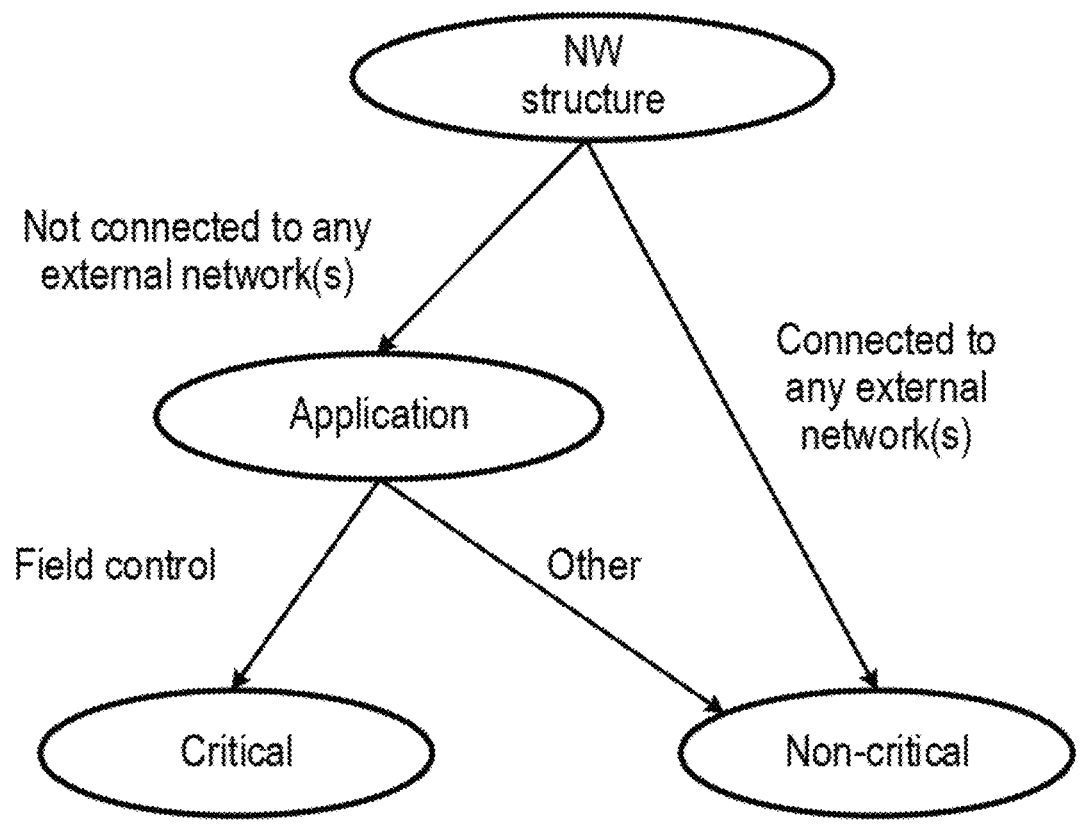
FIG. 6 illustrates an example criticality determination flow 600 using a feature value decision tree, in accordance with an example implementation.

FIG. 6 illustrates an example criticality determination flow 600 using a feature value decision tree, in accordance with an example implementation. As illustrated in FIG. 6, if a node has the feature value "connecting to any external networks", then the node is determined as non-critical. If a node has the feature value "not connected to any external network(s)", then an additional feature value determination on application type is made. Specifically, if the node has the feature value of "field control", then the node is determined as critical. On the other hand, if the feature value associate with application is one other than field control, then the node is determined as non-critical.

Figure 7:
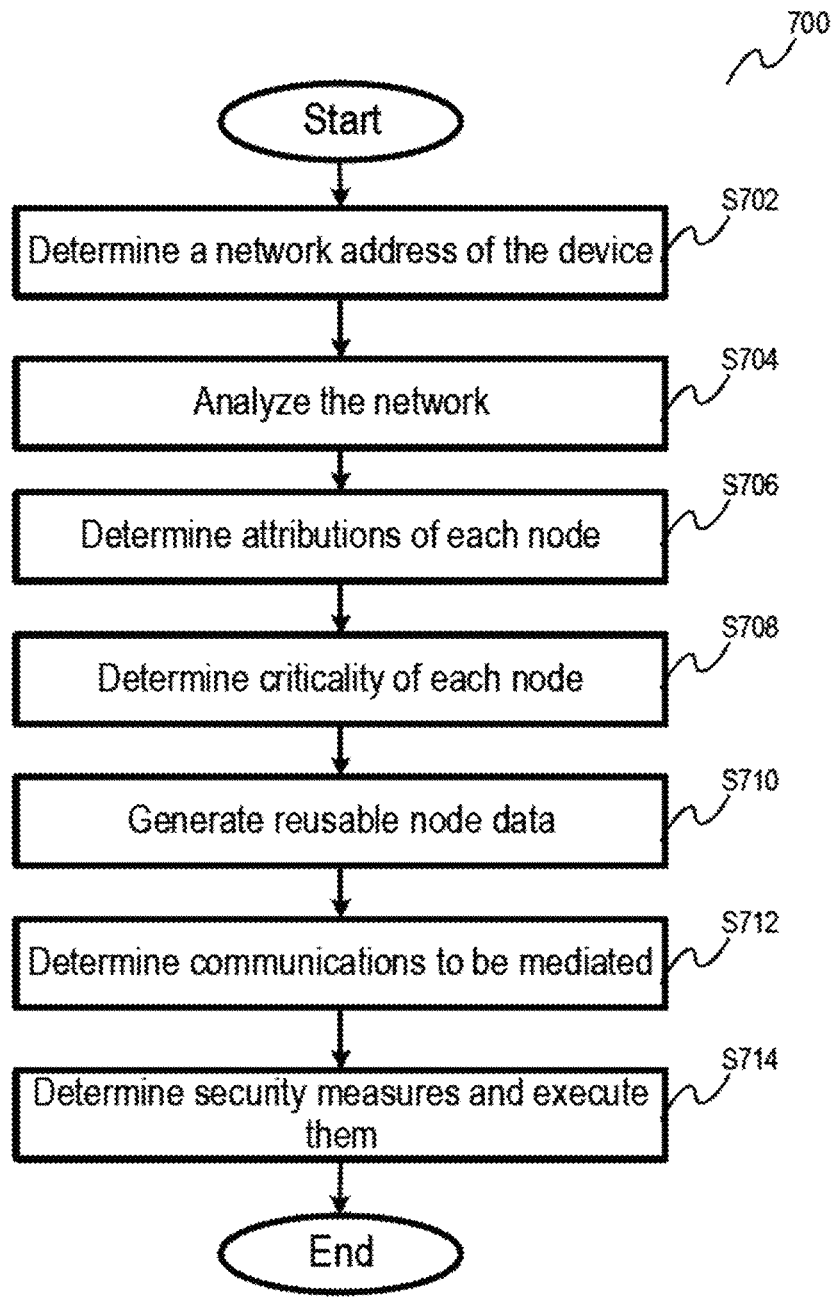
FIG. 7 illustrates an example process flow 700 for performing communication mediation, in accordance with an example implementation.

FIG. 7 illustrates an example process flow 700 for performing communication mediation, in accordance with an example implementation. Process flow 700 may be initiated at the time of device 100's network participation or any time as determined by the user. The process begins at step S702, where the device 100 determines its own network address. At step S704, the device 100 analyzes the network to obtain data/information on the network. At step S706, the device 100 determines attributions of each node. In some example implementations, attributions of each node can be input manually by users via the UI unit 306.

Next, the device 100 determine criticality of each node based on the received attributions at step S708. Criticality of each node is determined by attributions such as device type (e.g. host device, embedded device, etc.), software such as operating system (OS) (e.g. Microsoft Windows™, Linux™, non-enterprise OS, etc.) and other application software or middleware, networks that the node connects with, and role(s) in the system (e.g. control equipment, data acquisition, engineering, supervisory data management, web application, networking, etc.). In some example implementations, the device 100 can also determine the criticality from risk assessment results that are produced by human or automatic methods using the attributions.

The process then proceeds to step S710 where device 100 generates data that include node information such as IP or media access control (MAC) address. The node data are generated in reusable formats such as JSON, YAML, SQL, and any other data formats supported by the database management systems. Any program/software running on device 100 or other applications running external to the device 100 but are authorized to access the node data can retrieve those data any time as needed.

At step S712, the device 100 determines communications to be mediated. Finally, at step S714, the device 100 determines security measures to be enabled and executes them between the communications selected.

Figure 8:
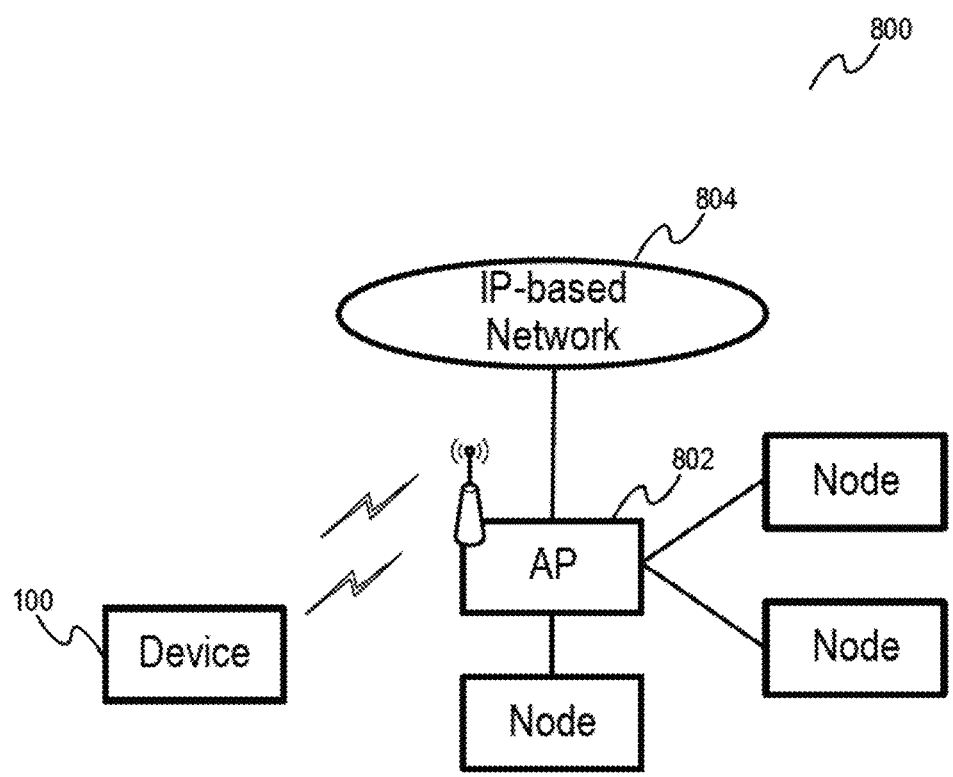
FIG. 8 illustrates an example communication system 800, in accordance with an example implementation.

Device 100 also has the ability to join IP-based wireless networks. FIG. 8 illustrates an example communication system 800, in accordance with an example implementation. Device 100 has the ability to join the IP-based wireless network 804 that is controlled by access point (AP) 802. The device also has the ability to spoof AP 210 can be spoofed by device 100 using any wireless-based man-in-the-middle methods. Communications between any two nodes in the wireless networks that are managed by AP 210 can be mediated using device 100.

The foregoing example implementation may have various benefits and advantages. For example, security measures such as deep intrusion analysis, packet filtering, authentication, etc., can be enabled on legacy systems to minimize risks of communication delays and resource depletion of the systems. In addition, effective security measures are enabled to provide protections to critical assets from attacks via vulnerable nodes.

Figure 9:
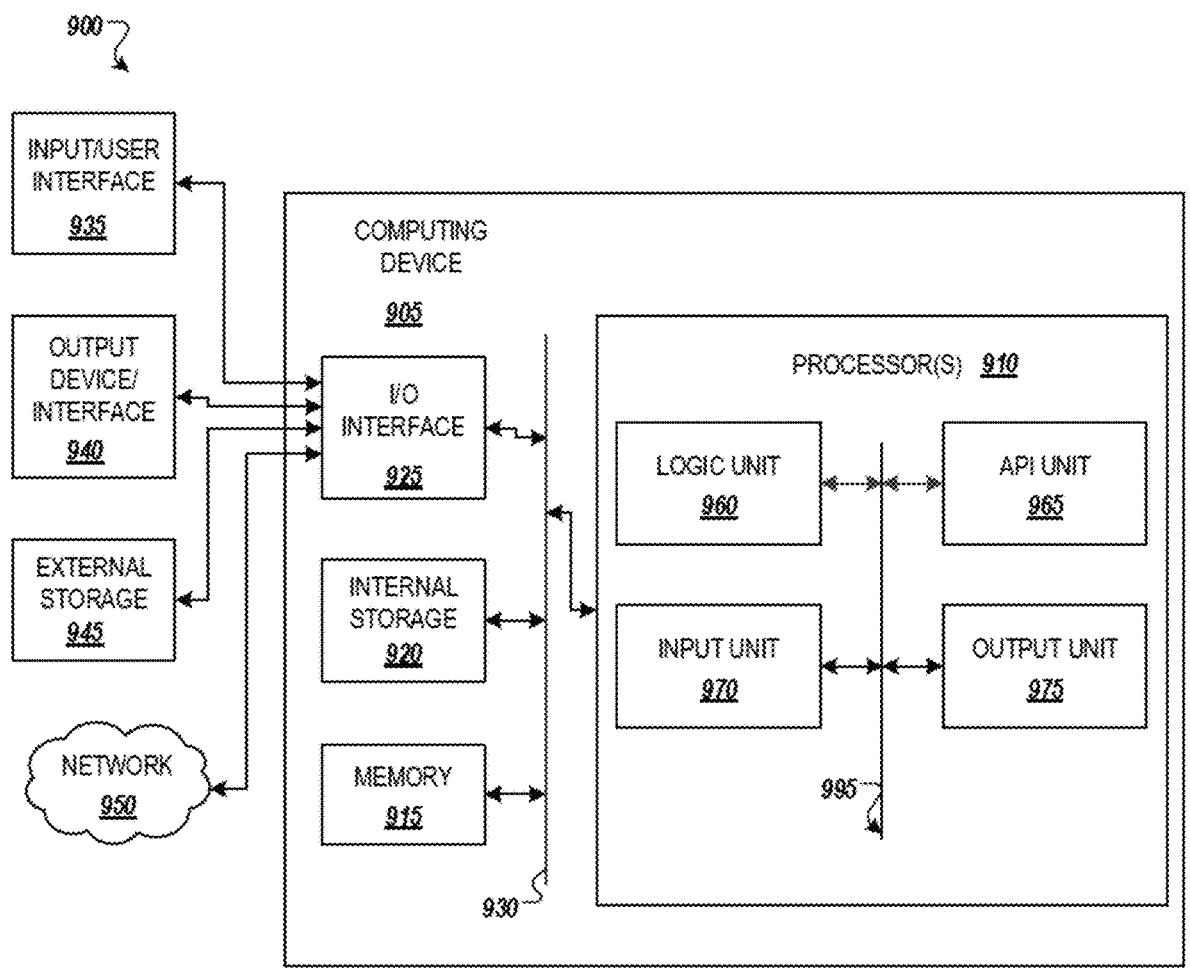
FIG. 9 illustrates an example computing environment with an example computer device suitable for use in some example implementations.

FIG. 9 illustrates an example computing environment with an example computer device suitable for use in some example implementations. Computer device 905 in computing environment 900 can include one or more processing units, cores, or processors 910, memory 915 (e.g., RAM, ROM, and/or the like), internal storage 920 (e.g., magnetic, optical, solid-state storage, and/or organic), and/or IO interface 925, any of which can be coupled on a communication mechanism or bus 930 for communicating information or embedded in the computer device 905. IO interface 925 is also configured to receive images from cameras or provide images to projectors or displays, depending on the desired implementation.

Computer device 905 can be communicatively coupled to input/user interface 935 and output device/interface 940. Either one or both of the input/user interface 935 and output device/interface 940 can be a wired or wireless interface and can be detachable. Input/user interface 935 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 940 may include a display, television, monitor, printer, speaker, braille, or the like. In some example implementations, input/user interface 935 and output device/interface 940 can be embedded with or physically coupled to the computer device 905. In other example implementations, other computer devices may function as or provide the functions of input/user interface 935 and output device/interface 940 for a computer device 905.

Examples of computer device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 905 can be communicatively coupled (e.g., via IO interface 925) to external storage 945 and network 950 for communicating with any number of networked components, devices, and systems, including one or more computer devices of the same or different configuration. Computer device 905 or any connected computer device can be functioning as, providing services of, or referred to as a server, client, thin server, general machine, special-purpose machine, or another label.

IO interface 925 can include but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computer device 905 can use and/or communicate using computer-usable or computer readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 910 can execute under any operating system (OS) (not shown), in a native or virtual environment. One or more applications can be deployed that include logic unit 960, application programming interface (API) unit 965, input unit 970, output unit 975, and inter-unit communication mechanism 995 for the different units to communicate with each other, with the OS, and with other applications (not shown). The described units and elements can be varied in design, function, configuration, or implementation and are not limited to the descriptions provided. Processor(s) 910 can be in the form of hardware processors such as central processing units (CPUs) or in a combination of hardware and software units.

In some example implementations, when information or an execution instruction is received by API unit 965, it may be communicated to one or more other units (e.g., logic unit 960, input unit 970, output unit 975). In some instances, logic unit 960 may be configured to control the information flow among the units and direct the services provided by API unit 965, the input unit 970, the output unit 975, in some example implementations described above. For example, the flow of one or more processes or implementations may be controlled by logic unit 960 alone or in conjunction with API unit 965. The input unit 970 may be configured to obtain input for the calculations described in the example implementations, and the output unit 975 may be configured to provide an output based on the calculations described in example implementations.

Processor(s) 910 can be configured to identify attributions of a plurality of nodes in communications with the network as shown in FIGS. 2 and 6-7. The processor(s) 910 may also be configured to determine criticality of each node of the plurality of nodes based on the attributions as shown in FIGS. 2 and 6-7. The processor(s) 910 may also be configured to mediate communications between nodes of the plurality of nodes that are determined as being non-critical and execute security functions on the mediated communications as shown in FIGS. 2 and 6-7.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to optical disks, magnetic disks, read-only memories, random access memories, solid-state devices, and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A security function execution device in communication with a network, the device comprising:
    a memory storing instructions; and
    a processor executing the instructions stored in the memory, the processor is configured to:
        identify attributions of a plurality of nodes in communications with the network;
        determine criticality of each node of the plurality of nodes based on the attributions; and
        mediate communications between nodes of the plurality of nodes that are determined as being non-critical and execute security functions on the mediated communications.

2. The device of claim 1, wherein determine criticality of each node of the plurality of nodes based on the attributions comprises:
    for a node of the plurality of nodes being connected to an external network, determine criticality of the node as non-critical;
    for a node of the plurality of nodes having application of field control, determine criticality of the node as critical; and
    for a node of the plurality of nodes having application other than field control, determine criticality of the node as non-critical.

3. The device of claim 2, further comprising:
    for a node of the plurality of nodes being determined as being critical, exclude the node from communication mediation.

4. The device of claim 1, wherein determine criticality of each node of the plurality of nodes based on the attributions comprises:

for a node of the plurality of nodes being associated with a critical process of business operations, determine criticality of the node as critical;

for a node of the plurality of nodes being determined as having computing resources less than a resource threshold, determine criticality of the node as critical;

for a node of the plurality of nodes not being associated with a critical process of business operations, determine criticality of the node as non-critical; and for a node of the plurality of nodes being determined as having computing resources equal to or more than the resource threshold, determine criticality of the node as non-critical.

5. The device of claim 1, wherein identify attributions of the plurality of nodes in communications with the network comprises automatically retrieving the attributions of the plurality of nodes from the network.

6. The device of claim 1, wherein the plurality of nodes comprises software components, hardware components, or a combination of software and hardware components, wherein software components comprise supervisory control and data acquisition (SCADA) systems, manufacturing execution systems (MES), manufacturing operation management (MoM) systems, and enterprise resource planning (ERP) systems, and wherein hardware components comprise field devices, controllers, and servers.

7. The device of claim 1, wherein the attributions comprise network structure, device type, application, resource, and processing state associated with the plurality of nodes.

8. The device of claim 1, wherein the network is a wireless network, and the plurality of nodes communicate with the wireless network through an access point that manages the wireless network; and wherein identify attributions of the plurality of nodes in communications with the network comprises identifying the attributions of the plurality of nodes by scanning the access point.

9. A method for security function execution, the method comprising:

identifying, by a processor, attributions of a plurality of nodes in communications with a network;

determining, by the processor, criticality of each node of the plurality of nodes based on the attributions; and mediating, by the processor, communications between nodes of the plurality of nodes that are determined as being non-critical and executing security functions on the mediated communications.

10. The method of claim 9, wherein determining criticality of each node of the plurality of nodes based on the attributions comprises:

for a node of the plurality of nodes being connected to an external network, determining criticality of the node as non-critical;

for a node of the plurality of nodes having application of field control, determining criticality of the node as critical; and for a node of the plurality of nodes having application other than field control, determining criticality of the node as non-critical.

11. The method of claim 10, further comprising:

for a node of the plurality of nodes being determined as being critical, excluding the node from communication mediation.

12. The method of claim 9, wherein determining criticality of each node of the plurality of nodes based on the attributions comprises:

for a node of the plurality of nodes being associated with a critical process of business operations, determining criticality of the node as critical;

for a node of the plurality of nodes being determined as having computing resources less than a resource threshold, determining criticality of the node as critical;

for a node of the plurality of nodes not being associated with a critical process of business operations, determining criticality of the node as non-critical; and for a node of the plurality of nodes being determined as having computing resources equal to or more than the resource threshold, determining criticality of the node as non-critical.

13. The method of claim 9, wherein identifying attributions of the plurality of nodes in communications with the network comprises automatically retrieving the attributions of the plurality of nodes from the network.

14. The method of claim 9, wherein the plurality of nodes comprises software components, hardware components, or a combination of software and hardware components, wherein software components comprise supervisory control and data acquisition (SCADA) systems, manufacturing execution systems (MES), manufacturing operation management (MoM) systems, and enterprise resource planning (ERP) systems, and wherein hardware components comprise field devices, controllers, and servers.

15. The method of claim 9, wherein the attributions comprise network structure, device type, application, resource, and processing state associated with the plurality of nodes.

16. The method of claim 9, wherein the network is a wireless network, and the plurality of nodes communicate with the wireless network through an access point that manages the wireless network; and wherein identifying attributions of the plurality of nodes in communications with the network comprises identifying the attributions of the plurality of nodes by scanning the access point.

* * * * *